Sept. 10, 1929.   J. H. GOSS   1727,819
FLOATING TRIM STUD
Filed Nov. 10, 1927
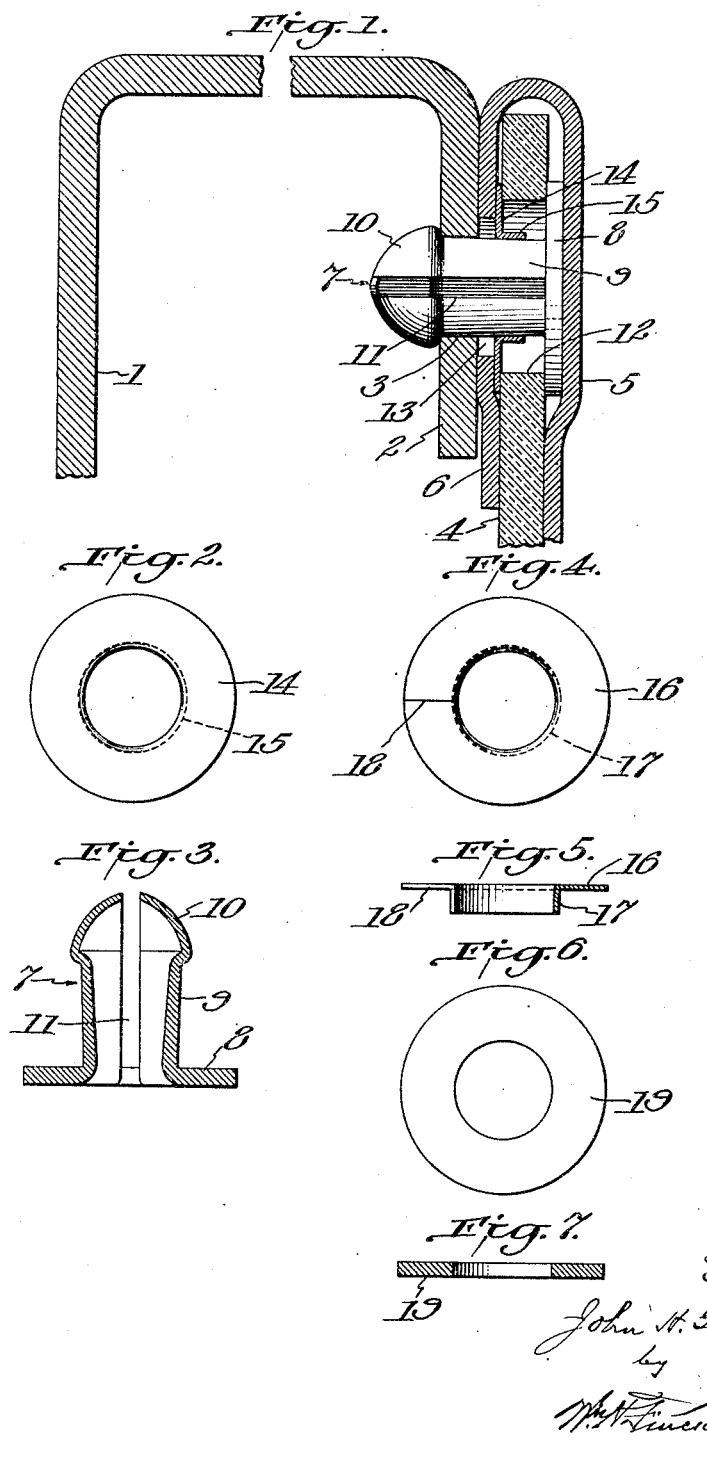

Patented Sept. 10, 1929.

1,727,819

UNITED STATES PATENT OFFICE.

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT.

FLOATING TRIM STUD.

Application filed November 10, 1927. Serial No. 232,452.

The object of this invention is to provide a stud for use primarily, but not exclusively, in attaching the trimming to automobile bodies which are built of metal, the stud being secured in place in such way that it may move or float on its attaching or supporting element to accommodate itself to the location of its complementary socket member.

In assembling the studs, it is desirable to have some means for retaining the stud in position when applied to the cardboard or other attaching or supporting element, but this means must be of such a character as not to injure the elastic limit of the spring shank and head of the stud, and it is also desirable that this means should be connected with the stud in a substantially fixed relation which will not interfere with the floating character of the stud by which the stud may move on its attaching or supporting element in seeking to register with the hole in a metallic element which it engages.

In the present invention, the stud not only is resilient but its shank in addition to its resilience is tapered sufficiently to assist in holding the locking washer in substantially fixed relation to the stud and its cardboard or other support.

The invention consists of a resilient stud, the shank of which is tapered from the flange or base toward the head, so that when a resilient or rigid locking washer is slipped over the head and onto the shank the resilience of the head and shank and the taper of the shank will serve to fix the washer in position to hold the stud in place without impairing the floating character of the stud, as I will proceed now to explain more fully and finally claim.

In the accompanying drawings illustrating the invention, in the several figures of which like parts are similarly designated, Figure 1 is a fragmentary vertical section of a portion of the metal part of an automobile door frame, the stud support, the trimming material, and the locking washer, the stud itself being shown in elevation. Fig. 2 is a top plan view of a non-resilient washer having a barrel as in Figs. 1, 4 and 5. Fig. 3 is a longitudinal section of the stud having a tapered shank. Fig. 4 is a top plan view and Fig. 5 is a cross-section of a resilient washer having a barrel. Fig. 6 is a top plan view and Fig. 7 is a cross section of a flat washer of thicker material than the other washers.

As already stated, the invention is primarily designed for use in attaching the trimming or trim of metal-bodied automobiles, but it is obvious that it may be applied to other articles where useful. I will describe my invention as applied to automobile bodies; and referring to Fig. 1, the numeral 1 may indicate a cross section of an angular metal door frame of an automobile, having the inturned flange 2 provided with the openings 3, which last serve as sockets to engage the heads of the stud members. 4 may represent the cardboard or other attaching or supporting element or member used in trimming the frame, and 5 may represent the trimming of leather, cloth or other material, which is laid over the outer side of the cardboard and its end or edge 6 turned over upon the inner side of the cardboard and confined by the fastening means comprising the socket 3, and a stud, designated generally by the numeral 7.

In this present invention the stud comprises a base or flange 8 from which rises the divided or split spring shank 9, terminating in a conoidal head 10, having a portion of greater diameter than the shank. It will be understood that the splits 11 extend from the base up through the shank and the head, so that both the shank and the head are resilient.

As will be seen by reference to Figs. 1 and 3, the shank flares or tapers outwardly from the base to the head. A flare or taper of a few thousandths of an inch is sufficient for the purposes of this invention.

The stud is mounted in a hole 12, in the support 4, with its flange 8 on the outside of the support and its shank 9 extending through the hole 12 and through a hole 13 in the turned-over portion 6 of the trimming or upholstery, and the head of the stud is forced through the hole 3 in the door frame.

The largeness of the hole 12 permits a floating action of the stud on its support in order to find and register with the hole 3. It will be noticed that the resilience of the split shank and head permits such a compression of the shank and head as to admit of the head extending through the hole 3 and thereafter expanding so that the head engages said hole.

In order to locate or lock the stud in floating position on the cardboard 4, there may be used any of a number of washers adapted to be slipped over the head of the stud, when said head is compressed, and then settled down on the tapered shank where, by reason of the reaction of the resilience of the head and shank and the taper of the shank, it will rest securely in set position and hold the stud in contact with its support 4, as indicated in Fig. 1.

The washer shown in Fig. 2, is non-resilient, and comprises the ring 14 provided with the depending barrel 15, as indicated in Fig. 2 and shown in Fig. 1.

The washer shown in Fig. 4, is resilient, and comprises the ring 16 having the depending barrel 17, the ring and the barrel being slit radially as indicated at 18. This form of resilient washer has the advantage of expanding somewhat in forcing it over the head 10 and then of returning to normalcy after passing the head and engaging the shank, and adding its resilience to that of the shank to hold the washer in place.

As shown in Figs. 6 and 7, the non-resilient washer may be composed of the ring 19 of a little thicker stock than the stock used in the previously described washers.

As already indicated, the diameter of the shank between the base and the head is a few thousandths of an inch greater than the diameter at the base.

When the washer is forced down over the head of the stud and on to its shank and towards the base, the diameter of the shank decreases and the natural taper from the head to the smaller diameter near the base, tends to form a resistance to the washer passing back toward the head and holds the washer in place.

It will be noticed in Fig. 3, that the shank of the stud is much thicker near the base, and consequently stiffer, which means that the normal taper holds the washer in place, and the fact that the stud is less resilient near the base than at the head tends to overcome the possibility of any normal strain moving the washer out of the desired position.

Also it is noted that the diameter of the hole in the washer is substantially the same as the decreasing diameter of the shank of the stud in the place at which the washer will ultimately rest.

Variations in details of construction are permissible within the principle of the invention and the scope of the claims following.

What I claim is:—

1. A floating trim stud, having a resilient head and shank, said shank tapering upwardly, a base at the bottom of the shank and of a diameter greater than an opening in a support upon which the stud is mounted and spanning said opening, and a washer sprung over the head and upon the shank and spanning the side of said opening opposite to the base to permit the stud to float in the opening so as to adjust itself to the location of a complemental socket.

2. A floating trim stud, having a resilient head and shank, said shank tapering upwardly and having its smaller diameter at the base of the stud, a base at the bottom of the shank and of a diameter greater than an opening in a support upon which the stud is mounted and spanning said opening, and a washer sprung over the head and upon the shank and spanning the side of said opening opposite to the base to permit the stud to float in the opening so as to adjust itself to the location of a complemental socket.

3. A floating trim stud, having a resilient head and shank, said shank tapering upwardly and having its smaller diameter at the base of the stud, the metal of the shank being of varying thicknesses, the metal being thinnest nearest the head of the stud and thickest near the base of the stud.

4. A floating trim stud, having a base, a shank rising therefrom and terminating in a head having a portion of greater diameter than the diameter of the shank and adapted to be mounted in a hole in a support of a diameter greater than the largest diameter of the head, the shank and head being resilient and said shank tapering from base to head, and a washer forced over the head and upon the shank and spanning the side of said hole opposite to the base to permit the stud to float in the hole so as to adapt itself to the location of a complemental socket, said washer applied to the shank between its head and the support and held in place thereon by the resilience and taper of the shank.

5. A floating trim stud, having a base, a shank rising therefrom and terminating in a head having a portion of greater diameter than the diameter of the shank and adapted to be mounted on a support, the shank and head being resilient, said shank tapering from base to head, and a washer having a depending barrel and applied to the shank and held in place thereon by the resilience and taper of the shank.

6. A floating trim stud, having a base, a shank rising therefrom and terminating in a head having a portion of greater diameter than the diameter of the shank and adapted to be mounted on a support, the shank and head being resilient, said shank tapering from base to head, and a resilient washer having a depending barrel and applied to the shank and held in place thereon by the resilience and taper of the shank plus the resilience of the washer.

In testimony whereof I have hereunto set my hand this 9th day of November A. D. 1927.

JOHN H. GOSS.